G. E. VOORHEES, Jr.
DEMOUNTABLE RIM WEDGE.
APPLICATION FILED MAY 11, 1920.

1,385,029.

Patented July 19, 1921.

Inventor
George E. Voorhees, Jr.
by Nestall and Wallace
his Attorneys

UNITED STATES PATENT OFFICE.

GEORGE EMMETT VOORHEES, JR., OF SANTA BARBARA, CALIFORNIA.

DEMOUNTABLE-RIM WEDGE.

1,385,029. Specification of Letters Patent. Patented July 19, 1921.

Application filed May 11, 1920. Serial No. 380,548.

*To all whom it may concern:*

Be it known that I, GEORGE EMMETT VOORHEES, Jr., a citizen of the United States, residing at Santa Barbara, in the county of Santa Barbara, State of California, have invented new and useful Improvements in Demountable-Rim Wedges, of which the following is a specification.

This invention relates to vehicle wheels, and pertains particularly to means for locking demountable rims to the fellies of wheels.

It is the primary object of this invention to provide a construction of the character described, whereby the rim may be slipped upon the felly and the means will automatically lock the rim in position. To remove the rim, one operation of compressing the means is sufficient to permit the rim to be removed. More particularly, this invention contemplates the provision of expansible locking wedges. In addition to the broader features of this invention, there are features of construction, whereby simplicity and strength of structure together with ease of manipulation are secured.

Figure 1:
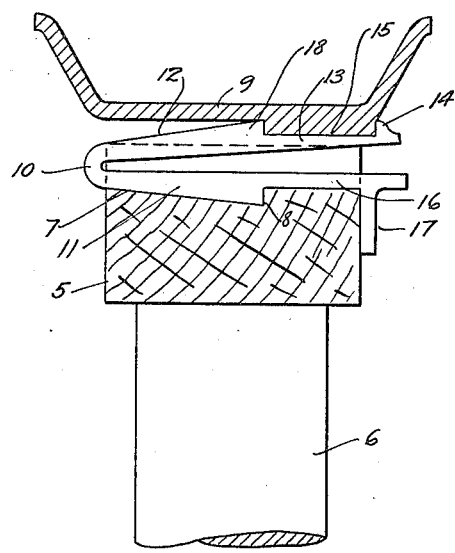
Figure 2:
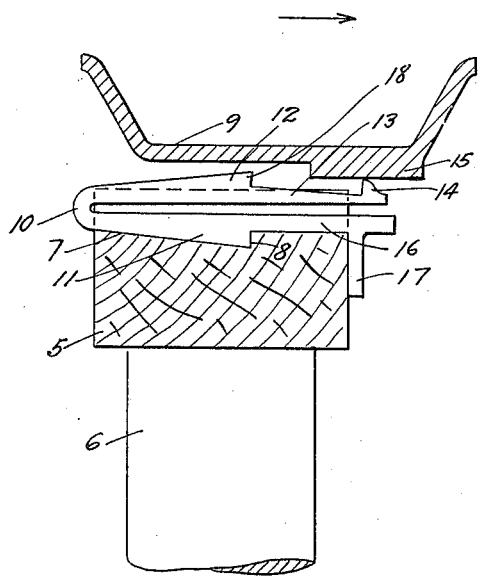
Figure 3:
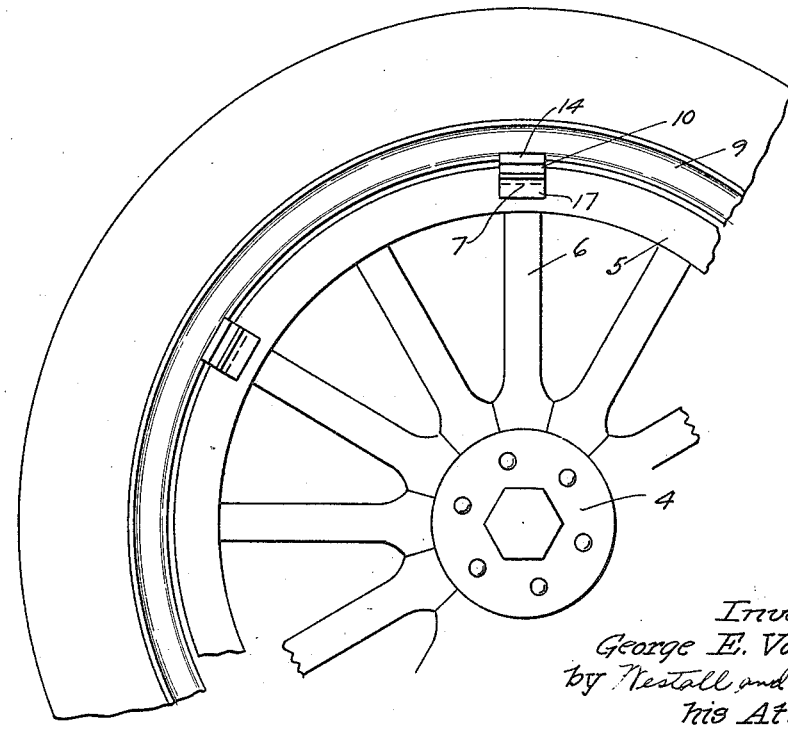

These objects will be more fully understood, as will also other objects and corresponding accomplishments of my invention from the following detailed description of a preferred embodiment thereof. For the purpose of this description, reference is had to the accompanying drawing, in which:

Figure 1 is a fragmentary radial section through the felly of a wheel, the rim and wedge, the rim being in position upon the wheel; Fig. 2 is a view similar to Fig. 1 showing the rim partially removed; and Fig. 3 is a side elevation of a fragment of an automobile wheel equipped with a pneumatic tire provided with my improved wedge.

Referring more particularly to Fig. 2, the hub of the wheel 4 having a fixed rim or felly 5 secured thereto by means of spokes 6 is shown. At uniformly spaced intervals about the felly 5, recesses 7 are formed. The recesses are provided with a shoulder 8. A demountable rim 9 of suitable size for slipping over the felly is provided.

Mounted in the recesses are expansible wedges indicated generally by 10. The wedges are each formed of oppositely disposed arms 11 and 12 constructed to have a barb like head. The wedges are preferably made of resilient material such as spring metal and are formed so that normally the arms are spread. A shank portion 13 of the upper arm extending back of the head has at its outer end a lug 14.

The rim 9 is formed on its inner side with an annular projection 15 adapted to fit within the recess formed back of the head and the lug 14. The shank portion 16 of the other arm has a downwardly extending lug 17 adapted to engage one side of the felly. The recess 7 conforms in shape with the lower face of the arm 11.

In order to place the demountable rim upon the wheel, the wedges 10 are contracted, as shown in Fig. 2. This permits the demountable rim to clear the lugs 14 as it is slipped into position upon the felly. After the rim is in the position shown in Fig. 1, the wedges are permitted to expand. The rim rests upon the felly, and is held against moving therefrom in one direction by means of the lugs 14, and in the other direction by the shoulders 18. The wedges cannot slip from their position by reason of the shoulders 8 and 14. It is obvious that to remove the demountable rim, the wedges should be contracted. This is easily done by pressing arms 11 and 12 toward each other, whereupon the rim may be slipped off of the felly in the direction of the arrow in Fig. 2.

It is obvious that I have provided means for securing a demountable rim to the wheel and locking it in position. To mount the rim upon the wheel or to remove the same, it is only necessary to contract the wedges. This is a simple operation. No bolts or nuts are required and time and labor are saved.

What I claim is:

1. In a wheel having a fixed rim provided with a plurality of recesses, each having a shoulder, the combination of a plurality of expansible wedges, each wedge having a face provided with a projection to rest against a shoulder, and a demountable rim having an internal shoulder, each wedge being provided with a shoulder on its opposite face to rest against the shoulder on said rim.

2. In a wheel having a fixed rim provided with a plurality of recesses, each recess being provided with a shoulder, the combination of a plurality of expansible wedges, each wedge having a face provided with a shoulder to rest against one of said first mentioned shoulders, and a demountable rim having an internal shoulder, each wedge being provided with a shoulder on its opposite face to rest against the shoulder on said demountable rim and a lug to engage against the face of the wheel and co-act with one of said shoulders to prevent lateral movement of said demountable rim.

3. In a wheel having a fixed rim provided with a plurality of recesses, each recess having a shoulder, the combination of a plurality of expansible wedges, each wedge having a face provided with a shoulder to rest against one of said first mentioned shoulders, and a demountable rim having an internal shoulder, each wedge being provided with a shoulder on its opposite face to rest against the shoulder on said rim and a lug to engage the face of said fixed rim and a lug to engage the face of said demountable rim, said lugs co-acting with said shoulders to prevent lateral movement of said demountable rim.

4. In a wheel having a fixed rim, the combination of a plurality of wedges, each wedge comprising arms resiliently pressed apart and having a barbed head, said fixed rim having a plurality of recesses conforming to the contour of one side of each wedge, and a rim having an internal shoulder to engage the barb on the other side of each wedge.

In witness that I claim the foregoing I have hereunto subscribed my name this 5th day of May, 1920.

GEORGE EMMETT VOORHEES, Jr.